March 29, 1966 L. STROMBECK 3,243,076

METHOD AND APPARATUS FOR DENESTING ARTICLES

Filed Sept. 1, 1964 5 Sheets-Sheet 1

Inventor
Leo Strombeck
By McCanna, Morsbach & Pillote
Atty's

March 29, 1966  L. STROMBECK  3,243,076
METHOD AND APPARATUS FOR DENESTING ARTICLES
Filed Sept. 1, 1964  5 Sheets-Sheet 3

Inventor
Leo Strombeck
By McCanna, Morsbach & Pillote
Atty's

Inventor
Leo Strombeck
By McCanna, Morsbach & Pillote
Atty's

United States Patent Office 3,243,076
Patented Mar. 29, 1966

3,243,076
METHOD AND APPARATUS FOR DENESTING ARTICLES
Leo Strombeck, Rockford, Ill., assignor to Anderson Bros. Mfg. Co., Rockford, Ill., a corporation of Illinois
Filed Sept. 1, 1964, Ser. No. 393,689
17 Claims. (Cl. 221—1)

This invention relates to a method and apparatus for dispensing articles from a nested stack.

In the dispensing of nested articles, it is the common practice to insert a member between the edge of the end article and the edge of the adjacent nested article to move the end article off the stack. However, the prior dispensers operate satisfactorily only if the edges of the end article are spaced sufficiently from the next adjacent article to enable insertion of such an article removing member therebetween. Some articles nest very closely, in the absence of suitable spacing lugs on the article, so that insertion of an element between the edges of the end article and the next adjacent article is not always possible. Moreover, articles do not always nest uniformly and adjacent articles sometimes tilt slightly relative to each other so that the edges of adjacent articles, even if spaced apart, are not spaced uniformly around the articles. Articles such as cup and dish shaped containers formed of thin flexible plastic material present particular problems. Such thin articles normally tend to nest very closely and, when the articles are formed of a flexible plastic material, the articles also tend to distend somewhat when pressure is applied to the superposed stack so that the adjacent containers become quite snugly and closely nested.

An important object of this invention is to provide a method and apparatus for dispensing articles from a nested stack which is operative to dispense closely nested articles.

Another object of this invention is to provide a method and apparatus for dispensing articles from a nested stack which is operative to dispense thin flexible articles.

Yet another object of this invention is to provide a method and apparatus for dispensing articles from a nested stack which does not require an initial spacing between the edges of the nested articles in order to achieve reliable dispensing of the articles from the stack.

Another object of this invention is to provide a method and apparatus for dispensing thin flexible articles from a nested stack and which is operative to effect an axial separation between the edge of the end article and the adjacent nested article prior to insertion of an article stripping member between the edge of the end article and the next adjacent article for separating the end article from the stack.

An important feature of the present invention resides in the provision of an apparatus for dispensing flexible articles from a nested stack and which operates to sequentially grip the end article by the side walls thereof and thereafter press the bottom of the end article inwardly to shift the adjacent nested article relative to the end article and thereby facilitate removal of the end article from the stack.

Still another object of this invention is to provide an apparatus having a simple and economical arrangement for operating the article gripping means and the article pressing means in timed relation with the stripping of the articles from the stack.

These, together with other objects and advantages of this invention will be more readily appreciated as the invention becomes better understood by reference to the following detailed description when taken in connection with the accompanying drawings wherein:

The present invention is particularly adapted for dispensing articles from a nested stack wherein the spacing between the edges of adjacent articles is either insufficient in magnitude or not sufficiently uniform due to relative tilting of adjacent nested containers, to enable insertion of a member between the edges of adjacent containers to positively separate the same. In general, the method and apparatus of the present invention is arranged to effect a partial separation of the end container from the adjacent nested container without engaging the edges of the end container, and to thereafter strip the end container from the stack by engagement with the edge of the end container. The method and apparatus is especially suited for use in dispensing containers formed of thin flexible material and may, for example, be used to denest containers formed of thin flexible plastic material such as polyethylene, polystyrene, polypropylene, polyvinylchloride, etc. The method and apparatus is moreover useful in dispensing articles of widely different size and shape including articles of the type commonly referred to as cup-shaped containers and dish-shaped containers, including both shallow and deep containers and containers of rectangular as well as other shapes. In general, the containers designated A each include a bottom wall 21 and a side wall 22 extending around the bottom wall and preferably diverging slightly relative thereto to facilitate nesting of the articles. The side walls terminate in a free edge 23 and, preferably, the articles have an outwardly extending flange or rim designated 23' at the free edge, it being understood that such flange or rim is not essential.

Figure 5:
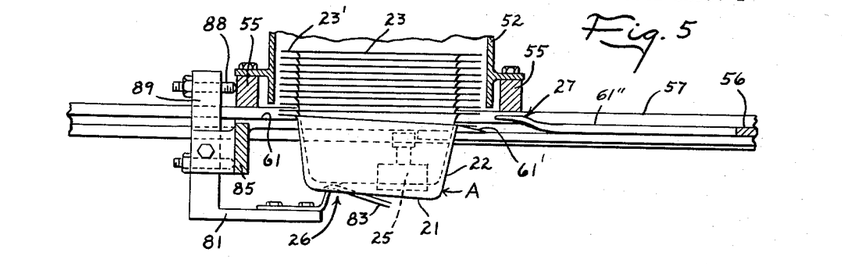
FIGS. 5–8 are fragmentary longitudinal sectional views through the dispensing apparatus illustrating the parts in different moved positions during dispensing of the end article from the stack.
Figure 6:
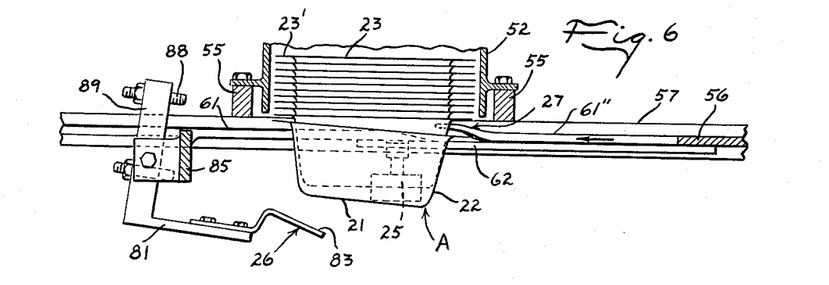
Figure 7:
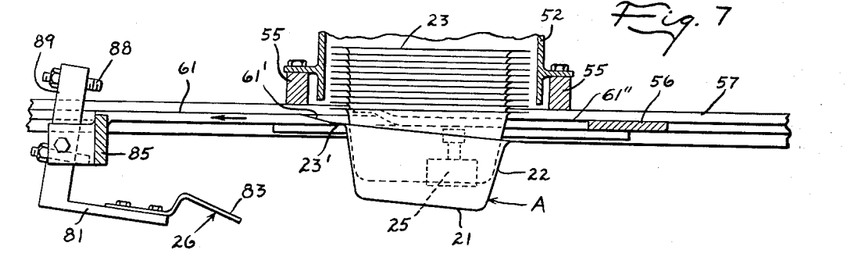
Figure 8:
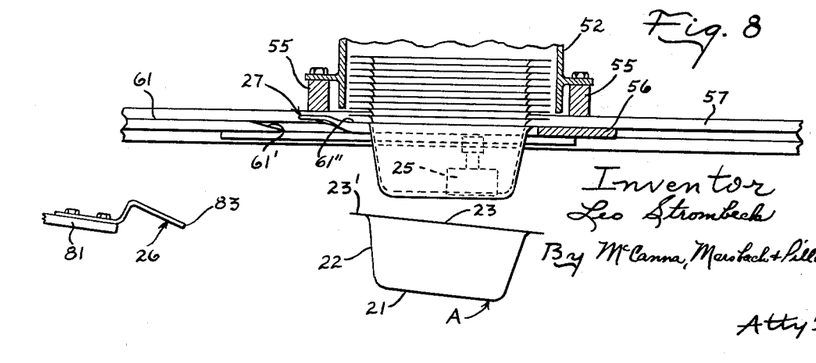
Figure 9:
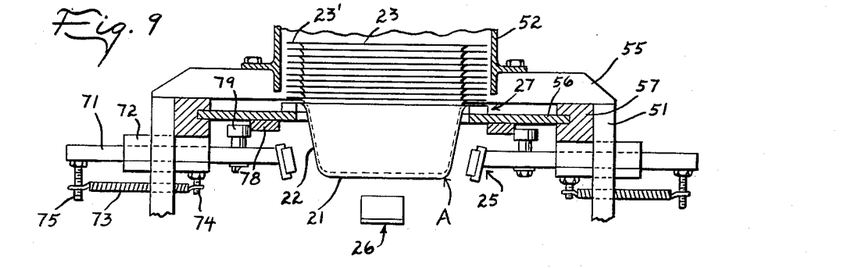
FIGS. 9–12 are transverse sectional views through the denesting apparatus illustrating the sequential steps of gripping the end article in the stack by engaging opposed side walls thereof; pressing the bottom of the end article inwardly to shift the adjacent nested article relative to the end article; and stripping the end article from the stack.
Figure 10:
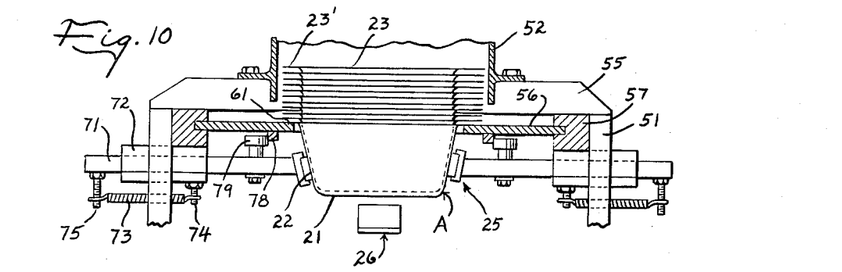

The sequential steps in the dispensing of articles from a nesting stack are diagrammatically shown in FIGS. 5–12. The nested articles are supported in a stacked or nested condition, preferably with the end article A at the lower end of the stack. The end article is initially gripped as shown in FIG. 10 to inhibit movement of the end article and is advantageously gripped between opposed gripping members 25 which engage the outer faces of the side walls 22 of the end article. Advantageously, the gripping means also preferably applies a light lateral pressure to the side walls of the end container to press the same slightly inwardly and against the next adjacent container to inhibit renesting of the containers after the latter are partially separated. The bottom wall 21 of the end container A is then pressed inwardly as by a presser member 26 shown in FIGS. 5 and 11 and sufficient to engage the bottom of the next adjacent container and shift the adjacent container and the superposed containers relative to the end container, to thereby effect a separation of the edge 23 of the end container from the edges of the next adjacent container. The end container is thereafter engaged by its upper edge 23 and pressed off the end of the stack. As shown diagrammatically in FIGS. 6 and 12, strippers 27 are moved into a position between the upper edge of the end container and the next adjacent container, after the end container and next adjacent container have been partially separated. Preferably, the strippers 27 are inserted part way between the flange on the end container and the flange on the next adjacent container before the gripping means 25 are moved to release the end container so that the pressure applied to the opposite sides of the container by the gripping means presses the side walls of the end container against the sides of the adjacent nested container and inhibits renesting of the containers. After the strippers have been inserted between the edges of the end and the next adjacent container, the gripping means is released as shown in FIG. 9 to allow the end container to move off the stack. The strippers 27 continue movement across the stack between the flanges on the end container and the next adjacent container as shown in FIGS. 7 and 8 to positively force the end container off the stack. The strippers 27 and the ledge portions 61″ on the slide 59 underlie the flange on the next adjacent container as they move across the stack and support the next adjacent container during removal of the end container from the stack, as best shown in FIGS. 6 and 7.

Preferably, in applying pressure to the bottom of the end container, the pressure is applied at a point offset to one side of the center of the end container as best shown in FIG. 5 so as to tend to tilt the end container relative to the stack and effect a relatively wider separation of the edge 23 of the end container from the edge of the adjacent nested container at the other side of the center of the end container. The stripper is preferably moved crosswise of the stack at a level to engage the edge 23 of the end container beginning at said other side of the end container where maximum separation of the flanges of the end and the next adjacent container occurs.

Figure 3:
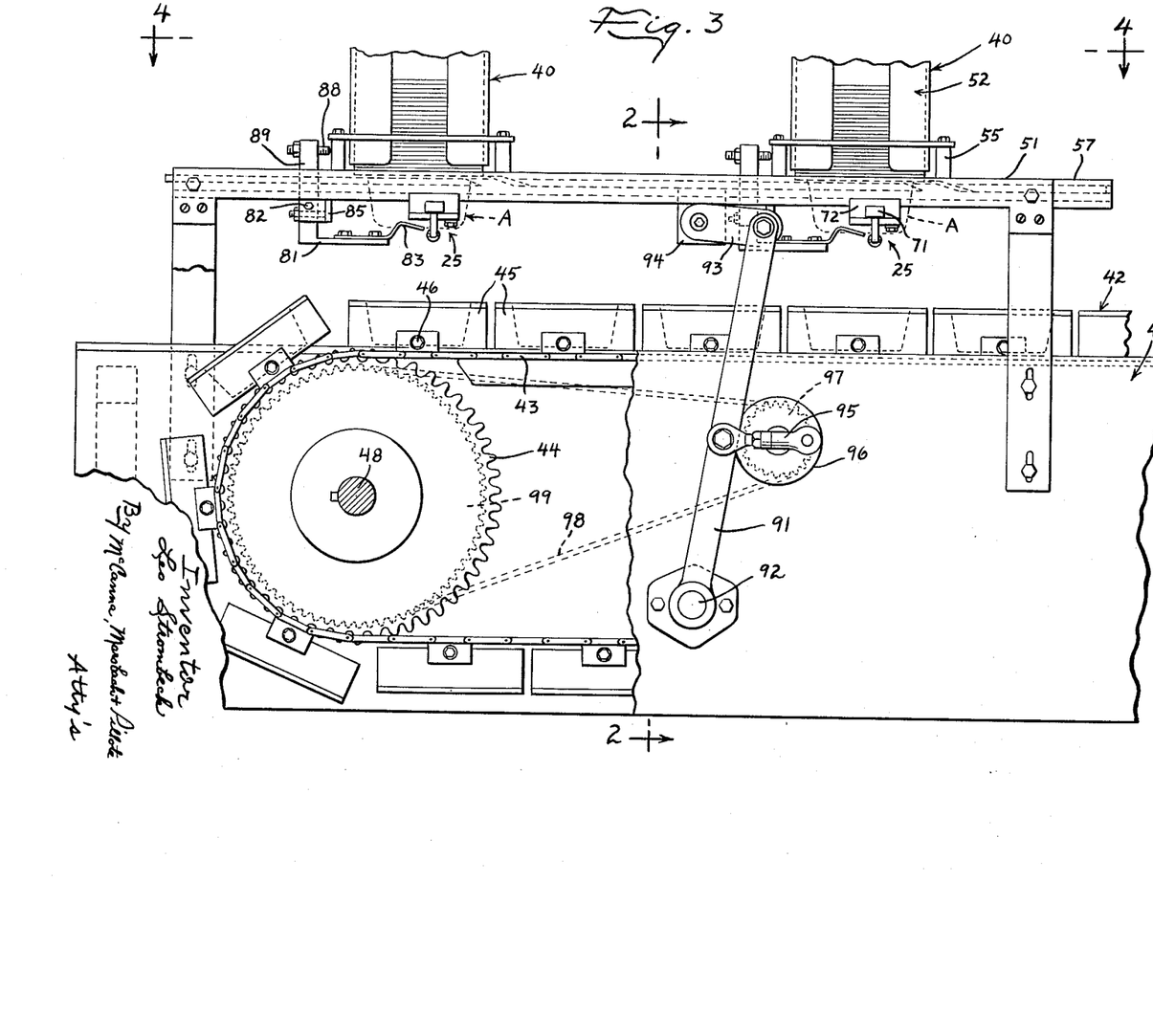
FIG. 3 is a fragmentary side elevational view of the dispensing apparatus.
Figure 4:
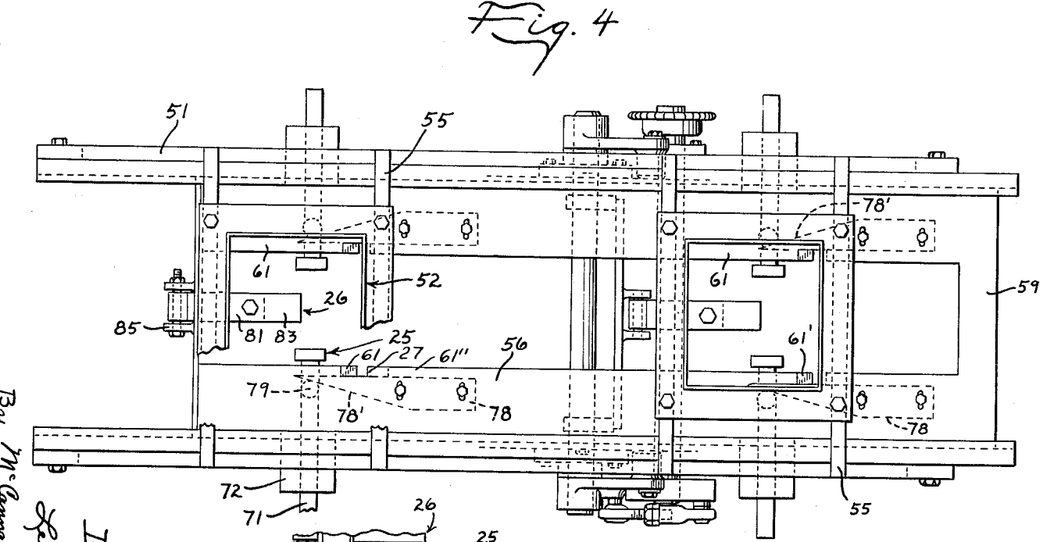
FIG. 4 is a plan view of the dispensing apparatus taken on the plane 4—4 of FIG. 3.

Reference is now made more specifically to FIGS. 1–4 which illustrate an apparatus for practicing the aforedescribed method. The article dispensing apparatus is advantageously used in conjunction with a filling machine designated generally by the numeral 41 and which employs a conveyor mechanism 42 for advancing the containers from the container dispensers 40 past the container filling mechanism (not shown) and past a sealing station. As shown in FIG. 3, the conveyor 42 includes a chain 43 entrained over sprockets 44. Article receiving trays 45 are conveniently provided on the conveyor to facilitate accurate positioning of the articles as they are advanced past the subsequent filling and sealing stations (not shown) and the pockets are attached to the chain conveyor as by brackets 46. The container dispensing apparatus 40 can be employed singly or in multiple to dispense articles onto the conveyor. As shown, a pair of article dispensers 40 are provided and are spaced apart along the conveyor a distance correlated with the spacing of the pockets to dispense the articles from the respective dispensers into spaced pockets on the conveyor. The dispensing apparatus is operated in timed relation with the conveyor and, where two dispensers are employed, one dispenser is arranged to dispense articles into alternate pockets on the conveyor and the other dispenser is arranged to dispense articles into the other pockets. Each of the dispensers 40 have a similar construction and like numerals are used to designate corresponding parts.

The dispensers 40 are mounted on a support frame 51 in overlying relation to the conveyor 43 and include a magazine 52 for receiving a stack of nested articles. In the embodiment shown, the magazine comprises a generally vertically extending guide which is mounted at its lower end on cross members 55 carried by the frame 51.

A slide is mounted on the support frame 51 for movement in a direction crosswise of the stack of articles in the magazine 52 and the slide includes spaced slide members 56 mounted for reciprocation in guideways 57 adjacent relatively opposite sides of the stack. The slide members are conveniently interconnected as by crosspiece 59 to effect movement of the slide members in unison and the slide members have ledge portions 61 which are normally positioned to underlie the flange 23′ on the lowermost article as shown in FIGS. 5 and 10 to support the lowermost article.

The ledge portions 61 have a downwardly inclined ramp portion 61′ at their trailing end and an upwardly and forwardly inclined stripper finger 27 (FIGS. 1 and 6) is provided on each of the slide members to extend upwardly to a level preferably slightly above the upper surface of the ledge portion 61 to extend over the top of the flange on the end article when the slide is extended, to thereby strip the end article off the stack.

Figure 1:
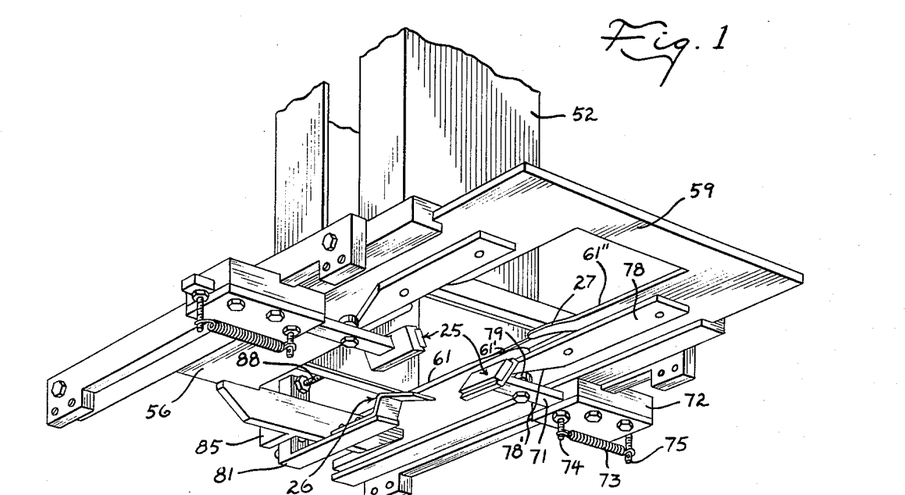
FIG. 1 is a fragmentary perspective view of an apparatus for dispensing articles from a nested stack.
Figure 2:
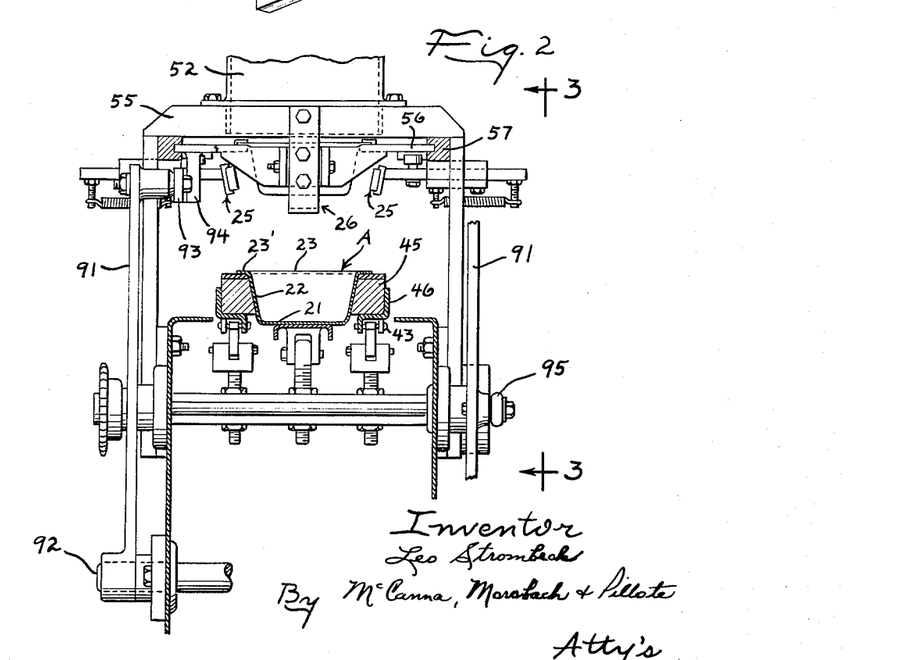
FIG. 2 is a fragmentary sectional view taken on the plane 2—2 of FIG. 3.
Figure 13:
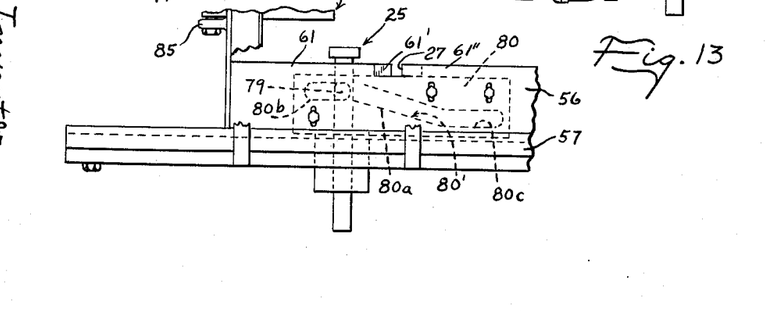
FIG. 13 is a fragmentary plan view illustrating a modified actuator for the article gripping means.

As previously noted, the upper edges 23 and the flanges 23′ on the end article are not always spaced uniformly or sufficiently from the edge of the next adjacent article to permit insertion of a stripper finger therebetween, and apparatus is accordingly provided for gripping the end container at the outer sides and for thereafter pushing upwardly on the bottom of the end container to effect a partial separation of the stripper fingers 27. The gripper means is best shown in FIG. 1 and includes opposed article engaging members 25 which are mounted for movement laterally of the stack into and out of engagement with the side walls of the end article. The members 25 preferably have a gripping surface and may be formed of rubber or the like having a composition and configuration adapted to frictionally grip the side walls of the articles when the members are pressed thereagainst. Alternatively, other means such as vacuum cups may be employed if desired to enhance the gripping action. The gripping members 27 are herein shown connected to rods 71 which are supported in guides 72 for reciprocation in a direction crosswise of the stack, and the carton gripping members are operated in timed relation with the movement of the slide 56. In the embodiment shown in FIGS. 1–12, the gripping members are yieldably urged inwardly into gripping engagement with the sides of the end carton as by springs 73 terminally attached to an anchor pin 74 and to a member 75 on the respective slide, and cam members 78 are connected to the slides 56 and have cam surfaces 78′ shaped and arranged to engage followers 79 on the carton gripping members to move the carton gripping members to their retracted position as the slide is extended. Advantageously, the cams and followers are so arranged on the slide 56 with relation to the stripper finger 27 as to move the gripping members to their released position after the stripper fingers have entered the space between the edge 23 of the end article and the edge of the next adjacent article. A modified form of actuator for the gripping means is shown in FIG. 13 and includes a cam 80 having a cam track 80′ shaped to engage the follower 79 and positively move the gripping means in and out. With the modified cam of FIG. 13, it is not necessary to employ the springs 73 and positive operation of the gripping means is achieved in timed relation with the movement of the slide 56. As shown in FIG. 13, the cam track 80′ has an intermediate groove portion 80a inclined to the path of travel of the slide and dwell portions at each end of the intermediate portion, which dwell portions 80b and 80c generally parallel to the path of movement of the slide. The cam 80 as well as the cam 78 are preferably adjustably attached to the slide 56, as by fasteners that extend through slots in the slide, to permit adjustment of the timing of the operation of the gripping means relative to the movement of the stripper fingers 27 on the slide. As will be seen, the dwell portions 80c control the inner positions of the article gripping means and, by adjustment of the cams 80 on the slide, can control the pressure applied by the gripping means to the end article.

Partial separation of the superposed articles from the end article is effected by the presser member 26 which engages the bottom of the end article and presses the bottom wall of the end article upwardly to shift the superposed articles relative to the end article. This presser member is conveniently in the form of an arm 81 which is pivotally mounted at 82 for swinging movement about a horizontal axis and which arm has a finger 83 at the outer end thereof adapted to engage the bottom of the end article. For reasons pointed out hereinafter, the presser member is advantageously mounted on the slide 56 for movement therewith and, as shown, the support bracket 85 therefor is attached to the slide. With this arrangement, the presser member moves with the slide into and out of position below the bottom of the stack and a means is provided for swinging the presser member about its pivot to press the same against the bottom of the end article. As shown, this includes an adjustable stop finger 88 which is connected through an arm 89 to the arm 81. The stop finger 88 is arranged to engage a stationary member such as the crosspiece 55 on the frame when the slide is moved to a preselected position to thereby swing the presser member upwardly against the bottom of the end article. The flexible bottom of the end article is pressed inwardly of the container and this pushes against the bottom of the next adjacent container to effect a partial separation of the end container from the other containers. When partially separated in this manner, the stripper finger 27 can be easily moved into the space between the flanges 23' of the end container and the next adjacent container to effect final separation of the end article from the stack. As best shown in FIG. 5, the article presser member 26 preferably engages the bottom of the end article at a point offset to one side of the center of the article and offset from the location where the grippers 25 engage the lower article, to tend to tilt the lower article relative to the next adjacent article. This effects a relatively wider separation of the edges 23 of the lower article from the next adjacent article at the side remote from the side engaged by the presser member. The stripper finger 62 is arranged to enter the space between the edges of the adjacent articles at the last mentioned side to effect stripping of the end article from the stack.

Any suitable means may be employed for operating the dispensers in timed relation with the conveyor. As shown, the operating means includes a lever 91 which is pivotally mounted at 92 on the main support frame. The other end of the lever is connected through a link 93 to a block 94 on the slide. A crank 95 is connected to the lever and to a crank-wheel 96 to oscillate the lever and reciprocate the slide in response to the turning of the crank-wheel. The crank-wheel is rotated in timed relation with the conveyor and, as shown, is connected through a sprocket 97, chain 98 and sprocket 99 to the conveyor shaft 48.

Figure 11:
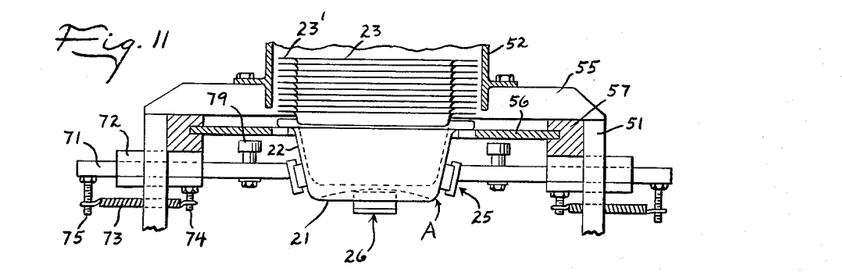
Figure 12:
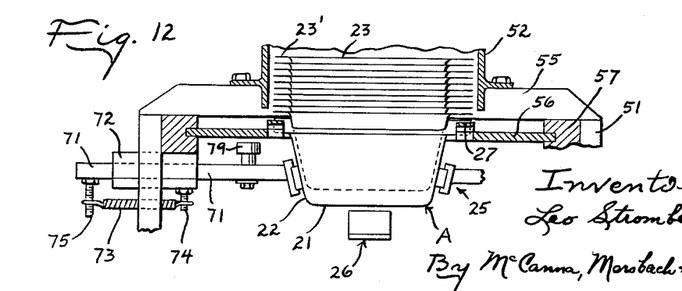

From the foregoing it is thought that the practice of the method and the operation and construction of the apparatus will be readily understood. The slide 56 is normally in the retracted position shown in FIGS. 4, 5 and 11, and the stack of nested containers in the magazine 53 is normally supported by the ledge portion 61 on the slides. When the slide is in its retracted position, the carton gripping members 25 are positioned to engage opposite sides of the end article. Further, when the slide is retracted, the stop finger 88 engages the stationary abutment 55 to move the article presser member 26 upwardly into engagement with the bottom wall of the end article. This presses the bottom wall of the end article inwardly as shown in FIGS. 5 and 11 to shift and effect partial separation of the superposed articles from the end article in the stack. Moreover, since the presser member engages the bottom at a point offset from the center of the end article, the end article will tend to tilt somewhat relative to the stack to effect a relatively wider separation at the other side of the article, as shown in FIG. 5. When the slide is thereafter extended, the ledge 61 on the slide moves out of supporting engagement with the underside of the flange on the end article as shown in FIG. 6 and the stripper finger 27 begins to move crosswise of the stack at a level above the flange on the end article and below the flange on the next adjacent article to strip the end article off the stack as shown in FIGS. 6 and 12. As the slide begins movement toward its extended position, the stop finger 88 disengages the abutment 55 and allows the article presser to drop downwardly away from the bottom as the article presser moves with the slide out of position below the stack as also shown in FIGS. 6 and 12. Preferably, the cams 78 (and cams 80 of FIG. 13) are arranged so as to allow the gripper members 25 to remain in engagement with the side walls of the article until after the stripper 27 has entered the space between the end article and the next adjacent article. The cams then operate to move the gripper members away from the end article as shown in FIG. 9 and thus allow the end article to drop off the stack onto the conveyor therebelow. During the subsequent retraction of the slide, the cams 78 move the grippers into engagement with the opposed sides of the next succeeding end carton as shown in FIG. 10 and the presser member is thereafter moved upwardly against the bottom of the end carton to deform the bottom of the end container and effect the aforementioned shifting and partial separation of the end carton from the next adjacent carton. When more than one dispenser is employed, the next operation of the dispensers is timed with relation to the movement of the conveyor so that each dispenser only dispenses articles into alternate pockets 45.

I claim:

1. An apparatus for dispensing hollow articles from a nested stack wherein the hollow articles are formed of a flexible material and have a bottom wall and side walls around the bottom wall comprising, means for receiving a stack of nested articles, opposed article gripping means having means for moving the same laterally of the stack into and out of engagement with the outer faces of the side walls of the end article in the stack at opposite sides of the end article to grip the end article, an article presser member having means for moving the same into and out of engagement with the bottom wall of the end article in the stack at the outer face thereof to press against the bottom wall of the end article, and an article stripper mounted for movement between the end article and the superposed articles operative to separate the end article from the stack.

2. An apparatus as set forth in claim 1 wherein said stripper includes an inclined ramp portion movable in a direction crosswise of the stack along a path to engage the edge of the end article and cam the same off the stack.

3. An apparatus as set forth in claim 1 wherein said gripping means and said presser member engage the end article at points offset from each other in a direction crosswise of the stack to tilt the end stack relative to the other articles in the stack.

4. In an apparatus for dispensing hollow articles from a nested stack wherein the hollow articles are formed of a flexible material and have a bottom wall and side walls extending around the bottom wall comprising, means for receiving a stack of nested articles, opposed article gripping means having means for moving the same laterally of the stack into and out of engagement with the outer faces of the side walls of the end article in the stack, an article presser member having means for moving the same into and out of engagement with the bottom wall of the end article in the stack to press the bottom wall of the end article inwardly and shift the adjacent nested article relative to the end article, and means for supporting the adjacent nested article when the article gripping means are moved out of engagement with the end article.

5. An apparatus as set forth in claim 4 wherein said presser member is swingably supported for movement into and out of engagement with the bottom wall of the end article.

6. In an apparatus for dispensing hollow articles from a nested stack wherein the hollow articles are formed of a flexible material and have a bottom wall and side walls around the bottom wall comprising, a magazine for receiving a stack of nested articles, a slide member mounted for movement along a path crosswise of the end of the magazine, opposed article gripping means mounted for movement laterally of the stack into and out of engagement with the outer faces of opposed side walls of the end article in the stack, an article pressure member mounted for movement into and out of engagement with the bottom wall of the end article in the stack to press the bottom wall inwardly and shift the adjacent nested article relative to the end article, an article stripper on said slide adapted to engage the edge of the end article when the slide is extended crosswise of the magazine, and means for operating said article gripping means, said article pressure member and said slide in timed relation.

7. An apparatus as set forth in claim 6 wherein said slide has an article support ledge engageable with the end article when the slide is retracted to support the end article and said stripper is spaced lengthwise of the slide from said ledge and shaped to engage the edge of the end article and cam the same off the stack when the slide is extended.

8. In an apparatus for dispensing hollow articles from a nested stack wherein the hollow articles are formed of a flexible material and have a bottom wall and side walls around the bottom wall comprising, a magazine for receiving a stack of nested articles, a slide member mounted for movement along a path crosswise of the end of the magazine, opposed article gripping means mounted for movement laterally of the stack into and out of engagement with the outer faces of opposed side walls of the end article in the stack, an article presser member mounted for movement into and out of engagement with the bottom wall of the end article in the stack to press the bottom wall inwardly and shift the adjacent nested article relative to the end article, an article stripper on said slide adapted to engage the edge of the end article when the slide is extended crosswise of the magazine, means operative when the slide is retracted to move said article gripping means into engagement with the end article and to thereafter move said presser member into engagement with the bottom of the end article and operative when the slide is extended to move the presser member away from the end carton and thereafter move said article gripping means away from the end carton.

9. An apparatus as set forth in claim 8 wherein said means for moving the article gripping means includes cam means on the slide.

10. An apparatus as set forth in claim 8 wherein said means for moving said gripper means comprises means yieldably urging said gripper means into engagement with said end article, and cam means operatively connected to said slide for moving said gripper means to their release position.

11. An apparatus as set forth in claim 6 wherein said article presser member is mounted on the slide for movement therewith.

12. In an apparatus for dispensing hollow articles from a nested stack wherein the hollow articles are formed of a flexible material and have a bottom wall and side walls around the bottom wall comprising, a support frame, a magazine mounted on the frame for receiving a stack of nested articles, a slide member mounted on the frame for reciprocation along a path crosswise of the end of the magazine, opposed article gripping means mounted on the frame for movement laterally of the stack into and out of engagement with the outer faces of opposed side walls on the end article in the stack, an article presser member mounted on the slide for movement therewith and for movement relative to the slide in a direction transverse to the direction of movement of the slide into and out of engagement with the bottom wall of the end article in the stack, an article stripper mounted on the slide for movement therewith and arranged to engage the edge of end article in the stack when the slide is moved in one direction, means operative when the slide member is moved to a position in which said presser member underlies the stack for moving the presser member relative to the slide to engage the bottom of the end article in the stack, and means for moving said article gripping means into and out of engagement with the end article in the stack in timed relation with the movement of the slide member.

13. The method of dispensing hollow nesting articles having a bottom wall and side walls extending around the bottom wall and formed of flexible material from a stack, comprising, supporting a stack of nesting hollow articles by engagement with the end article in the stack, gripping and holding the end article in the stack by engagement with the side walls thereof, pressing the bottom wall of said end article inwardly of said end article sufficient to engage and shift the adjacent nested article relative to the end article in the stack and effect a partial separation of the end article from the adjacent nesting article, and thereafter engaging and supporting the adjacent article in the stack and releasing said gripping, pressing and supporting engagement with the end article to allow removal of the end article from the stack.

14. The method of dispensing hollow nesting articles having a bottom wall and side walls extending around the bottom wall and formed of flexible material from a stack, comprising, supporting a stack of nesting hollow articles, gripping and holding the end article by engagement with the side walls thereof, pressing the bottom wall of the end article inwardly of said end article sufficient to engage and shift the adjacent nesting article relative to the end article in the stack and effect a partial separation of the end article from the adjacent nesting article, and thereafter engaging and supporting the adjacent article in the stack and removing said end article by pressing against the edge of the end article in a direction to force it off the stack while releasing said gripping and pressing engagement with the end article.

15. The method of dispensing hollow nesting articles having a bottom wall and side walls extending around the bottom wall and formed of flexible material from a stack comprising, supporting a stack of nesting hollow articles, gripping the opposed side walls of the end article in the stack to hold the end article and pressing the opposed side walls of the end article inwardly, pressing the bottom wall of the end article inwardly of said end article to shift the adjacent nesting article relative to the end article and effect partial separation of the end article from the adjacent article, inserting an element between the upper edge of the end article and the adjacent nesting article while maintaining said gripping and pressing on the side walls of the end article to inhibit renesting of the partially separated articles, removing the end article from the stack by pressing on the edge of the end article in a direction to force it off the stack while releasing said gripping and pressing on the side walls and said pressing on the bottom wall, and supporting the next adjacent article while removing of the end article from the stack.

16. The method of dispensing hollow articles having a bottom wall and side walls extending around the bottom wall and formed of flexible material from a stack comprising, supporting a stack of upwardly facing nested hollow articles, gripping the opposed side walls of the bottom article in the stack to hold the bottom article against upward movement and pressing the opposed side walls of the bottom article inwardly, pressing the bottom wall of the bottom article inwardly of the bottom article sufficient to engage and shift the next adjacent article upwardly relative to the bottom article and effect a partial separation of the bottom article from the next adjacent article, inserting an element between the upper edge of the bottom article and the next adjacent article while maintaining said gripping and pressing on the side walls of the bottom article to inhibit renesting of the partially separated articles, removing the bottom article from the stack by exerting downward pressure on the edge of the bottom article while releasing said gripping and pressing on the side walls and said pressing on the bottom wall, and supporting the next adjacent article while removing of the bottom article from the stack.

17. The method of dispensing hollow nesting articles having a bottom wall and side walls extending around the bottom wall and formed of a flexible material from a stack comprising, supporting a stack of upwardly facing nesting hollow articles, gripping and holding the bottom article by engagement with the side walls thereof, pressing the bottom wall of the bottom article inwardly of the bottom article at a point offset in a direction crosswise of the stack to one side of the center of the bottom article to effect partial separation of the bottom article from the adjacent nesting article, removing the bottom article by engagement with the edge of the bottom article beginning at the other side of the center thereof while releasing said gripping and pressing engagement with the bottom article, and supporting the adjacent nested article while removing the bottom article from the stack.

References Cited by the Examiner
UNITED STATES PATENTS

| | | | |
|---|---|---|---|
| 2,618,394 | 11/1952 | Miller | 221—223 |
| 3,083,868 | 4/1963 | Mueller | 211—221 |
| 3,100,583 | 8/1963 | Erickson | 221—36 |
| 3,122,267 | 2/1964 | Edwards | 221—1 |
| 3,165,233 | 1/1965 | West | 221—1 |
| 3,181,728 | 5/1965 | West et al. | 221—221 |

RAPHAEL M. LUPO, *Primary Examiner.*

WALTER SOBIN, *Examiner.*

UNITED STATES PATENT OFFICE
CERTIFICATE OF CORRECTION

Patent No. 3,243,076                      March 29, 1966

Leo Strombeck

It is hereby certified that error appears in the above numbered patent requiring correction and that the said Letters Patent should read as corrected below.

Column 6, line 57, for "stack", second occurrence, read -- article --; column 7, lines 12 and 19, for "pressure", each occurrence, read -- presser --; same column 7, lines 48 and 49, for "carton", each occurrence, read -- article --.

Signed and sealed this 10th day of January 1967.

(SEAL)
Attest:

ERNEST W. SWIDER                      EDWARD J. BRENNER
Attesting Officer                          Commissioner of Patents